Nov. 9, 1954     R. T. N. DRAKE     2,693,877
FLOTATION OF TALC FROM ORE CONTAINING METAL VALUES
Filed Jan. 7, 1953
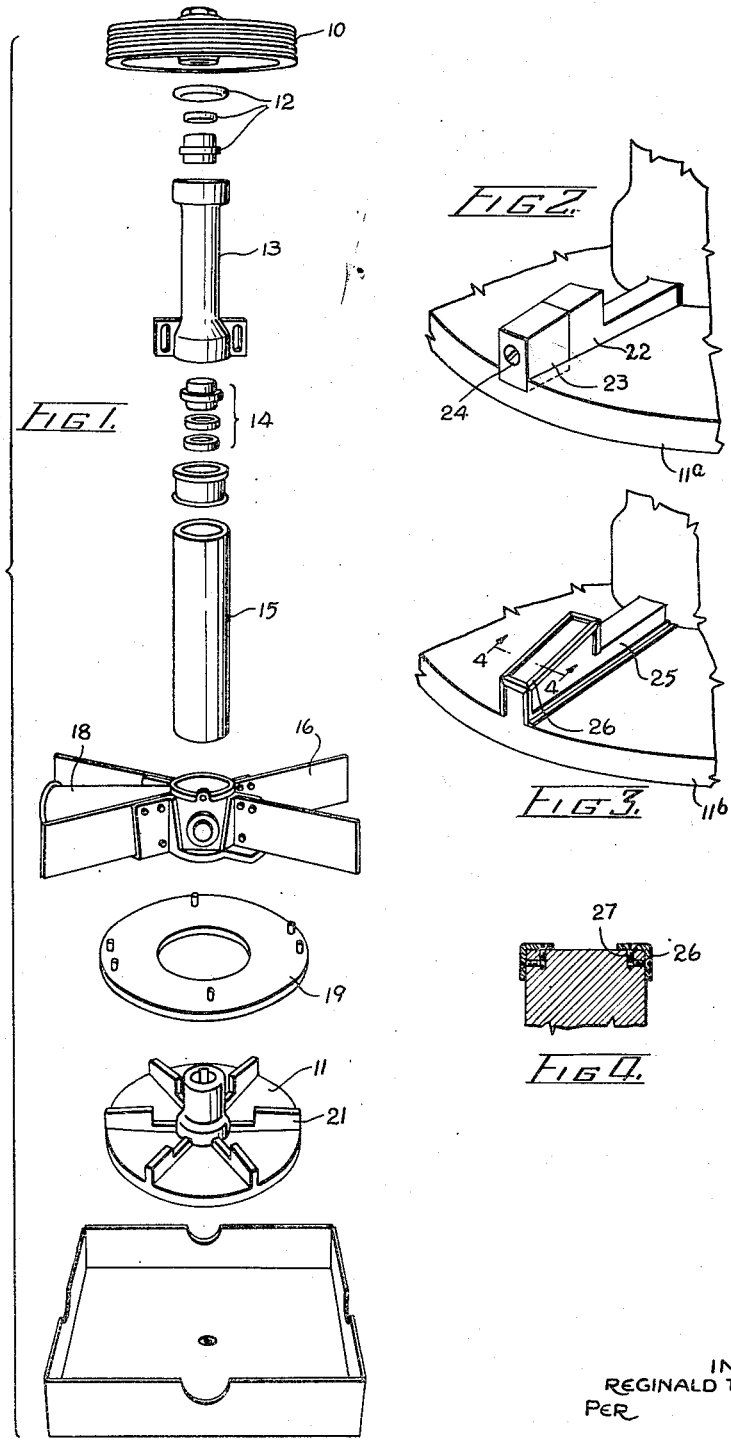
INVENTOR
REGINALD T.N. DRAKE
PER
ATTORNEY.

United States Patent Office 2,693,877
Patented Nov. 9, 1954

2,693,877

FLOTATION OF TALC FROM ORE CONTAINING METAL VALUES

Reginald T. N. Drake, Lynn Lake, Manitoba, Canada, assignor to Sherritt Gordon Mines Limited, Toronto, Ontario, Canada, a corporation of Ontario Application January 7, 1953, Serial No. 330,051

7 Claims. (Cl. 209—164)

This invention relates to a method of conditioning mineral ores prior to concentration by flotation.

Methods of treating ores for the concentration of economically valuable minerals are well known and are widely used. A flotation process is, possibly, the most widely used "wet" method of concentrating ores for effecting a preliminary separation of valuable constituents in the ores from worthless gangue material. Normally, ore is prepared for a flotation process by crushing and grinding, the degree of fineness to which the particles are ground being determined, at least in part, by the manner in which the mineral values are disseminated in the ore.

In the operation of a flotation process, a pulp mixture is prepared comprised of ore, aqueous solution, a frothing agent, a collecting agent or promoter and, possibly, a depressing agent, the agents added to the mixture being determined by the characteristics of the ore and the minerals it is desired to float. Air is fed into the ore pulp and with the frothing agent forms air bubbles. Particles of certain desired minerals become attached to the bubbles while other minerals will not so adhere and will remain in suspension in and settle to the bottom of the pulp mixture. The bubbles with adhering minerals rise to the surface of the pulp as froth, or "concentrate" which overflows the flotation machine by gravity, or which may be removed by mechanically operated skimmers. The non-floatable portion, or "tailings" discharges from the flotation machine through openings provided for that purpose.

There is an important problem in preparing mineral sulphide ores which contain talc, $H_2Mg_2(SiO_3)_4$, for concentration by a flotation process in that the talc floats, or rises, to the surface of the flotation cell with the floatable valuable constituents and carries with it an appreciable percentage of the minerals which it is the object of the overall concentrating treatment to recover. The presence of talc in the flotation concentrate is particularly objectionable in the subsequent treatment of the concentrate by hydrometallurgical methods in that it adversely affects the efficient extraction of the metal values.

It was found in a series of flotation tests conducted on a nickel-copper-cobalt sulphide ore containing from 8% to 15% floatable talc, that the talc float contained as high as from about 2% to 3% copper and from about 0.5% to about 1.5% nickel. This, of course, represents a serious loss of economically valuable minerals.

An important object of this invention is to subject mineral sulphides which contain talc to a preliminary conditioning treatment whereby at least a major portion of the talc is separated from the ore with a minimum loss of mineral values, whereby the talc can be discarded from the process without further treatment for the recovery of mineral values.

A further object of the invention is to subject mineral sulphide ore particles to a preliminary conditioning treatment prior to concentration by flotation whereby greatly improved results are obtained in respect of the flotation step, including improved recovery of mineral values in the concentrate and in the preparation of the concentrate in a form which facilitates subsequent treatment for the extraction of the metal values.

An understanding of the manner in which the above and other objects of the invention can be attained may be had from the following description, reference being made to the accompanying drawing, in which:

Figure 1 is an exploded view of the parts of an agitator assembly employed in a conventional flotation cell embodying the improvement of the present invention;

Figure 2 is a fragmentary view of an impeller which embodies a modification of the invention;

Figure 3 is a fragmentary view of an impeller which embodies a further modification of the invention; and Figure 4 is an end elevation of a blade of the impeller illustrated in Figure 3.

Like reference numerals refer to like parts throughout the description and drawing.

Referring to the agitator assembly illustrated in the drawing, the numeral 10 indicates a sheave or pulley connected to the upper end of a vertically disposed drive shaft, not shown. An impeller 11 is connected to the lower end of the drive shaft. The numeral 12 indicates the dust cap, locking collar and upper bearing assembly; the numeral 13 indicates a spindle bearing assembly; the numeral 14 indicates the lower bearing, locking collar and grease seal assembly; the numeral 15 indicates a stand pipe; the numeral 16 indicates a stationary hood which is provided with an air inlet 18; the numeral 19 indicates a circular wearing plate; and the numeral 20 indicates a bottom cell liner. The drive shaft, not shown, extends from the sheave 10 through this assembly to the impeller 11. Air for aerating the pulp mixture is fed through the air inlet 18 to and is discharged from the lower end of the stand pipe.

The agitator assembly, except for the improvements in the impeller described in detail hereinafter, is of a well known and widely used design.

The impeller 11 is provided, as illustrated in Figure 1, with radial blades or vanes 21 formed of a metal base alloy such as brass, zinc and aluminum, selected from the group consisting of copper, a copper The impeller 11a illustrated in Figure 2 is provided with blades or vanes 22 which are formed of conventional abrasion resisting material, such as iron, stainless steel, or conventional metal coated with abrasion resisting material such as moulded rubber, except for the tips 23 which are formed of a metal selected from the group consisting of copper, a copper base alloy such as brass, zinc and aluminum. In this modification of the invention, the tips are preferably replaceable, being securely attached to the ends of the blades by screws or bolts 24.

The impeller 11b illustrated in Figure 3 is provided with blades or vanes 25 formed of conventional abrasion resistant material. The vanes are provided with rims 26 which cover the upper surface and a portion of the side of each blade. These rims 26 are formed of a metal selected from the group consisting of a copper base alloy such as brass, copper, zinc and aluminum, and are attached to the blade by screws or bolts 27.

The ore treated in a flotation cell is usually abrasive material and the impeller blades are usually formed of or coated with abrasion resistant material. Consequently, the modifications of the invention illustrated in Figures 2 and 3 enable the formation of the major portion of each blade of abrasion resistant material and provide for the replacement of metals of lower resistance to abrasion and which are essential to the operation of the present method as required without replacement of the complete impeller.

It is also preferred that the wearing plate 19, when it is employed as a part of the agitator assembly, should be formed of a metal selected from the group consisting of copper, a copper base alloy such as brass, zinc and aluminum.

The method of the present invention comprises in general, the step of feeding an ore pulp mixture into a container, actively agitating the ore pulp in the container with an impeller having at least a portion of each blade formed of a metal selected from the group consisting of a copper base alloy such as brass, copper, zinc and aluminum, said impeller having a peripheral speed greater than about 2,000 feet per minute.

Factors which appear to affect the conditioning of the ore to separate the talc content with minimum entrainment of mineral values are:

1. The percentage of solids in the pulp mixture.
2. The metal of which the wear plate is formed in flotation cells which employ wear plates as part of the agitator assembly.
3. The metal of which the blades or parts of the blades of the impeller are formed.
4. The peripheral speed of the impeller.

In the treatment of mineral sulphide ore containing disseminated nickel, copper and cobalt values, it was found that the ore was slightly acid, about pH 6.1, and the best results in the flotation step were obtained by adding sodium hydroxide or calcium oxide to increase the pH value to within the range of from about pH 8.0 to pH 9. It has been found, in the treatment of this particular ore, that maximum results are obtained in the flotation step with an ore pulp having a pH value within the range of from about pH 8.7 to about pH 9.1.

The desired pH value can be obtained quite easily by adding about 0.125 pound of sodium hydroxide per ton of solids in the pulp mixture.

Various ratios of solids to water in the pulp mixture were tested and it was found that maximum results were obtained in using a pulp mixture comprised of from about 24% to about 30% solids. Lower percentages of solids produce better results in the conditioning treatment in that lower percentages of copper and nickel values in the talc float are obtained but the volume of pulp mixture to be treated is increased, while higher percentages of copper and nickel are found in the talc float as the percentages of solids was increased. The ratio of solids to water in the pulp mixture is determined with regard to the volume of mixture to be treated in the flotation step and the loss of mineral values in the talc removal step.

There are a number of conventional types of agitators employed with well known flotation cells. These are designed to provide maximum dispersion of the particles of the charge in aqueous aerated solution and maximum solids-liquid interphase. The size and diameter of the impeller are, therefore, designed to meet these objectives.

Certain flotation cells, such as that type manufactured by Denver Equipment Company and sold under the trademark "Sub-A," and described in detail in Denver Equipment Company Bulletin No. F 10.50, employ a wear plate as part of the agitator assembly positioned immediately above the impeller. It is found that when a wear plate forms part of the agitator assembly the best results are obtained in the talc separation step if the plate is formed with an exposed surface formed of a metal selected from the group consisting of brass, copper, zinc and aluminum.

It has been found, in extended tests with impellers formed of various types of materials, both conventional, and unconventional, that at least part of each blade of the impeller must have exposed surfaces formed of a metal selected from the group consisting of a copper base alloy such as brass, copper, zinc and aluminum.

A further most important factor in the operation of the method is the peripheral speed of the impeller blades. The lowest or minimum peripheral speed at which the talc can be separated from the ore in a form in which it can be discarded without serious loss of metal values appears to be of the order of about 2,000 feet per minute. Improved results are obtained as the peripheral speed of the impeller is increased to about 3100 feet per minute. The most satisfactory peripheral speed appears to be within the range of from about 2200 to about 2700 feet per minute.

The time of retention of the ore pulp in the conditioning cell is, of course, a factor in the efficient operation of the method. This can be readily determined for specific ores.

The following examples illustrate the results obtained in the operation of the method employing varying impeller peripheral speeds, times of retention, and employing various metals in the impeller blades and wear plates. In each instance, a sulphide ore was treated containing about 1.35% nickel and about 0.32% copper, from about 8% to 15% floatable talc, and having a pH value of from about 8.9 to about 9.1 produced by adding sodium hydroxide to the pulp mixture.

*Example I*

The impeller blades were formed of cast iron.

| Time (Minutes) | Peripheral Speed (F. P. M.) | Talc Float Cu | Talc Float Ni | Wear Plate | Type of Cell |
|---|---|---|---|---|---|
| 30 | 1,770 | 2.98 | .52 | None | Round. |
| 30 | 2,400 | 2.57 | .84 | Brass | Rectangular. |
| 30 | 1,560 | 2.16 | .79 | do | Do. |
| 30 | 2,250 | 2.62 | .67 | do | Do. |
| No Agitation | | 2.56 | 2.49 | do | Do. |
| 30 | 2,160 | 2.73 | 0.39 | Mild Steel | Do. |

*Example II*

The impeller blades were formed of mild or low carbon steel.

| Time (Minutes) | Peripheral Speed (F. P. M.) | Talc Float Cu | Talc Float Ni | Wear Plate | Type of Cell |
|---|---|---|---|---|---|
| 30 | 1,770 | 2.55 | 0.40 | Mild Steel | Round. |
| 30 | 2,050 | 2.63 | 0.58 | do | Rectangular. |
| 30 | 2,600 | 2.44 | 1.28 | do | Do. |
| 10 | 1,610 | 2.84 | 2.23 | do | Do. |
| 30 | 1,090 | 2.63 | 0.95 | Brass | Do. |
| 30 | 2,600 | 2.96 | 1.02 | do | Do. |
| 30 | 2,600 | 2.61 | 0.33 | (Low pressure air introduced to determine effect). | |
| 60 | 2,600 | 2.46 | 0.30 | | |

*Example III*

The impeller blades were formed of stainless steel.

| Time (Minutes) | Peripheral Speed (F. P. M.) | Talc Float Cu | Talc Float Ni | Wear Plate | Type of Cell |
|---|---|---|---|---|---|
| 30 | 1,770 | 2.50 | 0.48 | | Round. |
| 60 | 1,770 | 0.90 | 0.28 | | Do. |
| 15 | 1,770 | 2.75 | 0.51 | | Do. |
| 30 | 2,150 | 2.91 | 0.37 | | Do. |
| 30 | 3,750 | 2.44 | 0.34 | | Do. |
| 30 | 3,330 | 2.12 | 0.48 | Mild Steel | Rectangular. |
| 30 | 5,300 | 2.26 | 0.88 | do | Do. |
| 30 | 6,870 | 2.05 | 0.76 | do | Do. |
| 30 | 2,600 | 2.05 | 1.32 | do | Do. |
| 30 | 2,600 | 1.53 | 1.73 | do | Do. |

*Example IV*

The impeller blades were formed of zinc.

| Time (Minutes) | Peripheral Speed (F. P. M.) | Talc Float Cu | Talc Float Ni | Wear Plate | Type of Cell |
|---|---|---|---|---|---|
| 30 | 2,600 | 0.18 | 0.38 | Copper | Rectangular. |
| 30 | 1,560 | 1.72 | 0.47 | do | Do. |
| 30 | 2,600 | 0.49 | 0.44 | do | Do. |
| 30 | 2,600 | 0.61 | 1.31 | Zinc | Do. |
| 30 | 2,600 | 0.54 | 1.41 | Copper | Do. |

Example V

The impeller blades were formed of brass.

| Time (Minutes) | Peripheral Speed (F. P. M.) | Talc Float | | Wear Plate | Type of Cell |
|---|---|---|---|---|---|
| | | Cu | Ni | | |
| 15 | 2,400 | 0.82 | 0.41 | Brass | Rectangular. |
| 30 | 2,400 | 0.25 | 0.34 | ---do----- | Do. |
| 60 | 2,400 | 0.15 | 0.19 | ---do----- | Do. |
| 60 | 2,400 | 0.17 | 0.43 | ---do----- | Do. |
| 30 | 2,390 | 0.16 | 0.30 | ---do----- | Do. |
| 30 | 3,020 | 0.16 | 0.31 | ---do----- | Do. |
| 30 | 1,770 | 0.87 | 0.41 | ---do----- | Do. |
| 30 | 2,080 | 0.16 | 0.37 | ---do----- | Do. |
| 30 | 3,740 | 0.13 | 0.35 | ---do----- | Do. |
| 30 | 2,400 | 0.34 | 0.36 | ---do----- | Do. |
| 45 | 2,600 | 0.10 | 0.27 | ---do----- | Round. |
| 60 | 2,600 | 0.21 | 0.42 | ---do----- | Do. |

Example VI

The impeller was formed of aluminum.

| Time (Minutes) | Peripheral Speed (F. P. M.) | Talc Float | | Wear Plate | Type of Cell |
|---|---|---|---|---|---|
| | | Cu | Ni | | |
| 60 | 2,500 | .35 | .58 | Brass | Rectangular. |
| 45 | 2,500 | .62 | .61 | ---do----- | Do. |

Example VII

The impeller was coated with a rubber paint.

| Time (Minutes) | Peripheral Speed (F. P. M.) | Talc Float | | Wear Plate | Type of Cell |
|---|---|---|---|---|---|
| | | Cu | Ni | | |
| 30 | 2,600 | 3.04 | 2.68 | Rubber Painted Brass. | Rectangular. |
| 30 | 2,500 | 2.29 | 0.58 | -----do---------- | Do. |

Example VIII

The impeller was formed of copper.

| Time (Minutes) | Peripheral Speed (F. P. M.) | Talc Float | | Wear Plate | Type of Cell |
|---|---|---|---|---|---|
| | | Cu | Ni | | |
| 30 | 2,600 | .49 | 1.14 | Zinc | Rectangular. |

Example IX

The impeller blades were formed of various metals and were provided with brass tips.

IRON WITH BRASS TIPS

| Time (Minutes) | Peripheral Speed (F. P. M.) | Talc Float | | Wear Plate | Type of Cell |
|---|---|---|---|---|---|
| | | Cu | Ni | | |
| 45 | 2,640 | 0.57 | 0.28 | Brass | Round. |

MILD STEEL BRASS RIMMED

| Time (Minutes) | Peripheral Speed (F. P. M.) | Talc Float | | Wear Plate | Type of Cell |
|---|---|---|---|---|---|
| | | Cu | Ni | | |
| 60 | 2,500 | 0.35 | 0.68 | Brass | Rectangular. |
| 45 | 2,700 | 0.22 | 0.40 | ---do----- | Do. |

It will be noted from the above examples, that the two essential factors in reducing the mineral values carried by talc float separated from the ore are the exposure of a metal selected from the group consisting of copper, a copper base alloy such as brass, zinc and aluminum to the pulp mixture as a part of the impeller blades and the peripheral speed of the impeller. For example, when a cast iron impeller was rotated at a peripheral speed above 2000 feet per minute, the copper content of the float was within the range of from 2.73% to 2.51%, and similar results were obtained in the use of mild steel and stainless steel.

A talc float containing from about 0.18% to 0.61% copper was obtained in using an impeller provided with zinc blades, and similar results were obtained in using an impeller formed of copper, aluminum and brass blades, and in the use of blades rimmed with brass, as illustrated in Figure 3, or provided with brass tips, as illustrated in Figure 2.

The shape of the cell does not appear to affect the results. The impeller is positioned adjacent the bottom of the cell and is of a diameter conventionally employed in a flotation cell.

The conditioning step of the present invention possesses a number of important advantages. It can be operated inexpensively in a conventional flotation cell prior to the actual flotation operation. It is very effective in separating the floatable talc from the ore and the mineral values of the talc float can be reduced to the extent that the talc can be discarded without further treatment.

It is understood that the word "brass" used herein and throughout the appended claims is intended to identify a copper base alloy comprised of copper alloyed with zinc and/or tin and may include one or more other metals, such as lead, phosphorous, and antimony, to enhance specifically desired characteristics, such as hardness, resistance to corrosion, tensile strength and machinability, according to conventional practice.

What I claim as new and desire to protect by Letters Patent of the United States is:

1. The method of preparing an ore containing mineral values and floatable talc for concentration by flotation, which comprises feeding a pulp mixture of said ore and solution into a container, agitating said pulp mixture with an impeller rotating at a peripheral speed greater than 2000 feet per minute, the blades of said impeller having surfaces exposed to the pulp mixture formed of a metal selected from the group consisting of copper, brass, zinc and aluminum, and overflowing talc from the surface of the pulp mixture.

2. The method of preparing an ore containing mineral values and floatable talc for concentration by flotation, which comprises feeding a pulp mixture of said ore and solution into a container, agitating said pulp mixture with an impeller rotating at a peripheral speed greater than 2000 feet per minute, said impeller having blades formed of a metal selected from the group consisting of copper, brass, zinc, and aluminum, and overflowing talc from the surface of the pulp mixture.

3. The method of preparing an ore containing mineral values and floatable talc for concentration by flotation, which comprises feeding a pulp mixture of said ore and solution into a container, agitating said pulp mixture with an impeller rotating at a peripheral speed greater than 2000 feet per minute, the blades of said impeller having tips formed of a metal selected from the group consisting of copper, brass, zinc and aluminum, and overflowing talc from the surface of the pulp mixture.

4. The method of preparing an ore containing metal values and floatable talc for concentration by flotation which comprises forming an aqueous alkaline pulp mixture of solids and solution, agitating said pulp mixture with an impeller rotating at a peripheral speed greater than 2000 feet per minute, the blades of said impeller having surfaces exposed to the pulp mixture formed of a metal selected from the group consisting of copper, brass, zinc and aluminum, and overflowing talc from the surface of the pulp mixture.

5. The method of preparing an ore containing metal values and floatable talc for concentration by flotation which comprises forming an aqueous pulp mixture of solids and solution having a pH value within the range of from about pH 6 to about pH 9, agitating said pulp mixture with an impeller rotating at a peripheral speed greater than 2000 feet per minute, the blades of said impeller having surfaces exposed to the pulp mixture formed of a metal selected from the group consisting of copper, a copper base alloy, zinc and aluminum, and overflowing talc from the surface of the pulp mixture.

6. The method of preparing an ore containing metal values and floatable talc for concentration by flotation which comprises froming an aqueous alkaline pulp mixture of a solution containing from about 24% to about 30% by weight solids, agitating said pulp mixture with an impeller rotating at a peripheral speed greater than 2000 feet per minute, the blades of said impeller having surfaces exposed to the pulp mixture formed of a metal selected from the group consisting of copper, brass, zinc and aluminum, and overflowing talc from the surface of the pulp mixture.

7. The method of preparing an ore containing metal values and floatable talc for concentration by flotation which comprises forming an aqueous alkaline pulp mixture of solids and solution, aerating the pulp mixture and agitating it with an impeller rotating at a peripheral speed greater than 2000 feet per minute, the blades of said impeller having surfaces exposed to the pulp mixture formed of a metal selected from the group consisting of copper, brass, zinc and aluminum, and overflowing talc from the surface of the pulp mixture.

References Cited in the file of this patent

Taggart: "Handbook of Ore Dressing," published 1927 by John Wiley & Sons, Inc., New York city, pages 800 and 801.

Taggart: "Handbook of Mineral Dressing," published 1945 by John Wiley & Sons, Inc., New York city, section 12, pages 66–68.

Gaudin: "Flotation," © 1932 by McGraw-Hill Book Co., Inc., New York city, pages 260–264. (All publications available in Division 25.)

U. S. Buerau of Mines Report of Investigations 3314, dated Oct. 1936, 12 pages. (Copy available in Scientific Library.)